Dec. 8, 1936.  R. E. BURK  2,063,789
COUNTER CURRENT APPARATUS FOR TREATING PETROLEUM OIL
Filed June 14, 1935
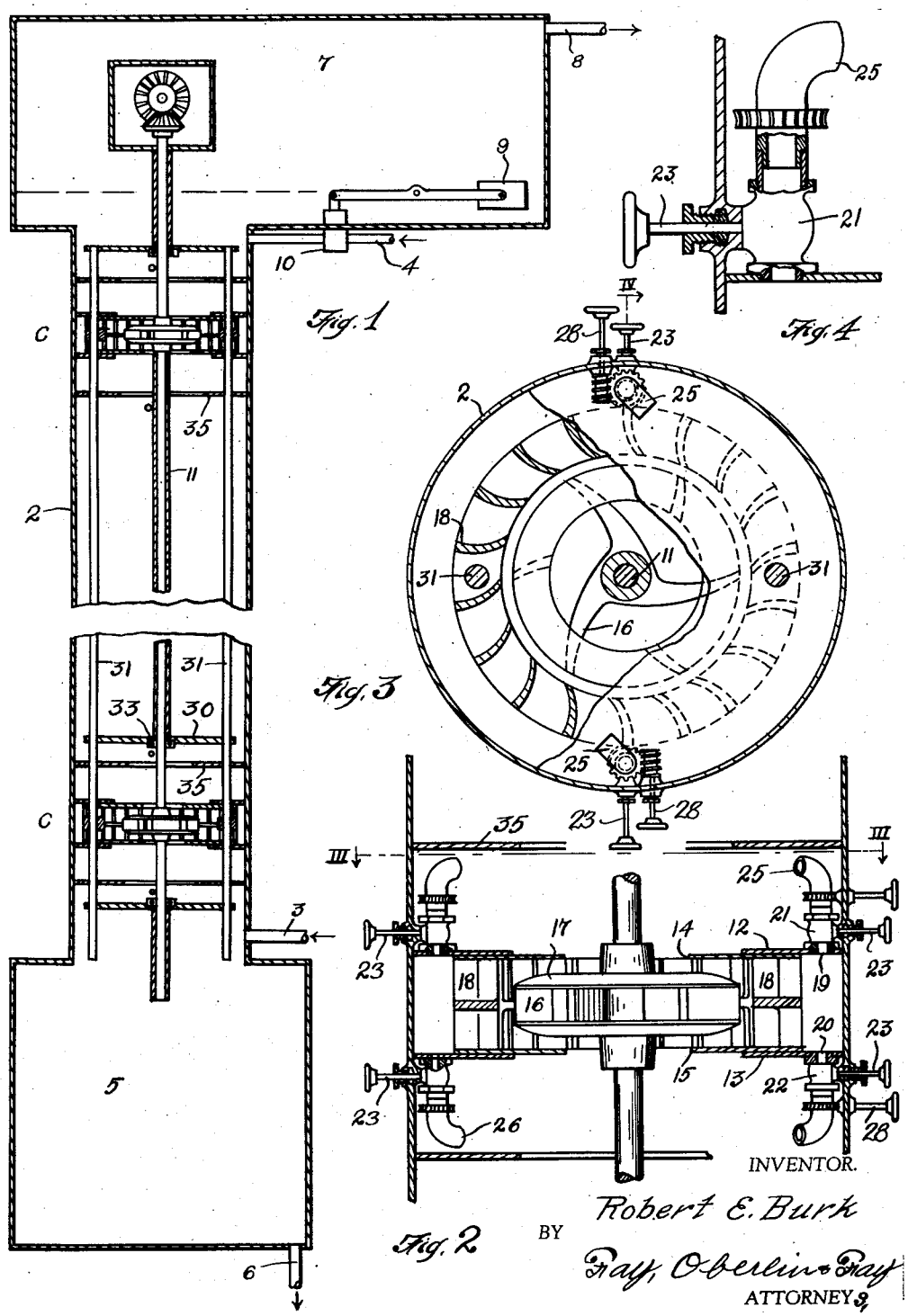
INVENTOR.
Robert E. Burk
BY
Ralf, Oberlin & Bray
ATTORNEYS Patented Dec. 8, 1936

2,063,789

UNITED STATES PATENT OFFICE 2,063,789

COUNTERCURRENT APPARATUS FOR TREATING PETROLEUM OIL

Robert E. Burk, Cleveland, Ohio, assignor to The Standard Oil Company (Ohio), Cleveland, Ohio, a corporation of Ohio Application June 14, 1935, Serial No. 26,664

9 Claims. (Cl. 196—46)

In the treating of oils, etc., where dissimilar liquids are mixed and then separated, it has long been known to bring the liquids together countercurrently. On account of channeling and irregular current action, the thoroughness of mixing has not been such as has been desired, and in an effort to assist this condition, mixer blades and baffle arrangements have been suggested. While improvement has resulted, either a desirably thorough mixing or ready flow in two directions has been sacrificed. I have now found that this has been the result of too general an application of propelling action instead of sharply intensive zones of high pressure, and in accordance with the present invention it now becomes possible to operate liquids of close physical character and with rapid throughput and small power consumption.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:—

Fig. 1 is a vertical sectional view of an embodiment of the invention; Fig. 2 is an enlarged vertical sectional detail of the same; Fig. 3 is a transverse section taken on a plane substantially indicated by line III—III, Fig. 2, partly broken away; and Fig. 4 is an enlarged sectional detail taken on a plane indicated by line IV—IV, Fig. 3.

Referring more particularly to the drawing, there is shown a container 2 of elongated chamber form, and having an inlet connection 3 in its lower portion for admission of one of the liquids involved, particularly the lighter liquid gravitationally considered, and an inlet 4 in the upper part of the container for admission of other liquid. At the bottom an enlargement or settling compartment 5 is provided, and an outlet connection 6 serves for discharge of the heavier liquid. At the top, another enlargement or settling compartment 7 is provided, with an outlet connection 8 for removal of the lighter liquid. A float control 9 operating a valve 10 is desirable also for the maintenance of a controlled level of inter-face between the liquids finally stratifying at this point, the control being exerted upon the feed-in of the treating liquid.

Within the container 2 are impellers C, in number as desired in accordance with the intensity of action wanted, and these may be mounted for driving by a common drive shaft 11, which is provided with a suitable source of driving power. About each impeller is a housing of upper and lower elements 12, 13, forming compartments closed except for openings 14, 15, above and below, through which liquid may feed to the centrifugal impellers. The latter are desirably of a form involving curved blades 16, and having guards 17 preventing transverse spill-out movement of the liquid impelled. Surrounding each impeller are angularly placed diverters 18, these preferably being dished or curved in the direction of flow. The housing members 12, 13, are further provided with outlet openings 19, 20, and desirably these are guarded by valves 21, 22, operating connections therefor 23 extending out through suitable stuffing boxes in the chamber wall, whereby each valve may be independently regulated as desired, in view of the materials being operated with. From each outlet opening, a directional nozzle 25, or 26 serves to prevent cross currents, and these nozzles are preferably furthermore arranged to be controllably directed, connections 28 for this purpose extending out through suitable stuffing boxes in the chamber wall.

Between the impellers are plates 30 centrally arranged, and these are supported by support rods 31 which extend longitudinally through the container. In the plates 30, or at least a sufficient number of them, are bearings 33 for the impeller drive shaft. Spaced also between the impeller units may be partial partitions 35, of annular form, having their central openings opposite the plates 30.

In operation, the liquid to be treated, for example a mineral lubricating oil, and the treating liquid, for example an extracting solvent, are supplied by the respective inlet connections 3, 4, and with the impeller shaft in rapid rotation, the liquids pass countercurrently to the successive zones, the lighter liquid traveling in a general direction upwardly, and the heavier liquid traveling in a general direction downwardly. At each impeller zone, the liquid mass is violently passed into the central inlet openings, and thence being hurled by the impeller blades into the impeller housing and against the diverter 18, the mixed liquid churning violently in the confined space there determined. Escape from said zone is then had via the outlet openings, and according as the upper or lower valves are predominantly opened the amount of mixing at each zone may be controlled as desired. By adjustment of the direction of the outlet nozzles also, the amount of mixing or the amount of divergence for intermediate separating may be determined. The liquids thus tending to separate at such intermediate zones flow progressively, each in its general direction, and finally, the oil or liquid being treated reaches the top of the chamber, where with the incoming treating liquid, a final separation is demarked, and the treated oil is drawn off.

Other modes of applying the principle of the invention may be employed, change being made as regards the details described, provided however, the features stated in any of the following claims, or the equivalent of such, be employed.

I therefore particularly point out and distinctly claim as my invention:—

1. Apparatus of the character described, comprising an elongated chamber, a centrifugal impeller therewithin, a housing about said impeller, an inlet opening to the impeller in said housing centrally above and below, discharge openings from said housing peripherally of the impeller above and below, valves for controlling said discharge openings, and angular nozzles on the discharge openings.

2. Apparatus of the character described, comprising an elongated chamber, a series of centrifugal impellers therewithin, a housing about each impeller, an inlet opening to the impeller in said housing centrally above and below, discharge openings from said housing peripherally of the impeller above and below, valves for controlling said discharge openings, angular nozzles on the discharge openings, and means for the control of the direction of the nozzles.

3. Apparatus of the character described, comprising an elongated chamber, a series of centrifugal impellers therewithin, a housing about each impeller, an inlet opening to the impeller in said housing centrally above and below, discharge openings from said housing peripherally of the impeller above and below, valves for controlling said discharge openings, angular nozzles on the discharge openings, means for the control of the direction of the nozzles, and partial partitions between impeller housings providing settling spaces.

4. Apparatus of the character described, comprising an elongated chamber, a settling compartment at the top and the bottom thereof, a series of centrifugal impellers in said chamber, a housing about each impeller, an inlet opening to the impeller in said housing centrally above and below, discharge openings from said housing peripherally of the impeller above and below, valves for controlling said discharge openings, angular nozzles on the discharge openings, and means for the control of the direction of the nozzles.

5. Apparatus of the character described, comprising an elongated chamber, a settling compartment at the top and the bottom thereof, a series of centrifugal impellers in said chamber, a housing about each impeller, an inlet opening to the impeller in said housing centrally above and below, discharge openings from said housing peripherally of the impeller above and below, valves for controlling said discharge openings, angular nozzles on the discharge openings, means for the control of the direction of the nozzles, and partial partitions between impeller housings providing settling spaces.

6. Apparatus of the character described, comprising an elongated chamber, a series of centrifugal impellers therewithin, diverters angularly around the impellers, a housing about each impeller, an inlet opening to the impeller in said housing centrally above and below, discharge openings from said housing peripherally of the impeller above and below, valves for controlling said openings, angular nozzles on the discharge openings, and means for the control of the direction of the nozzles.

7. Apparatus of the character described, comprising an elongated chamber, a series of centrifugal impellers therewithin, a shaft carrying said impellers, a housing about each impeller, an inlet opening to the impeller in said housing centrally above and below, discharge openings from said housing peripherally of the impeller above and below, valves for controlling said discharge openings, angular nozzles on the discharge openings, and means for the control of the direction of the nozzles.

8. Apparatus of the character described, comprising an elongated chamber, a series of centrifugal impellers therewithin, a shaft carrying said impellers, a housing about each impeller, an inlet opening to the impeller in said housing centrally above and below, discharge openings from said housing peripherally of the impeller above and below, valves for controlling said discharge openings, angular nozzles on the discharge openings, plates spaced between the housings, and support-rods extending through said plates and said housings.

9. Apparatus of the character described, comprising an elongated chamber, a series of centrifugal impellers therewithin, a shaft carrying said impellers, a housing about each impeller, an inlet opening to the impeller in said housing centrally above and below, discharge openings from said housing peripherally of the impeller above and below, valves for controlling said discharge openings, angular nozzles on the discharge openings, plates spaced between the housings, bearings for said shaft in said plates, and support-rods extending through said plates and said housings.

ROBERT E. BURK.